May 30, 1933.　　　A. L. BAUSMAN　　　1,911,875
METHOD AND APPARATUS FOR DECORATING CONFECTIONS
Filed Feb. 12, 1930　　　4 Sheets-Sheet 2

INVENTOR.
ALONZO LINTON BAUSMAN
BY Chapin & Neal
ATTORNEYS.

Patented May 30, 1933

1,911,875

UNITED STATES PATENT OFFICE

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS

METHOD AND APPARATUS FOR DECORATING CONFECTIONS

Application filed February 12, 1930. Serial No. 427,933.

This invention relates to a method of, and apparatus for, decorating confections or the like.

The invention is related to that branch of the confection decorating art, wherein the decorations are formed in the plastic outer surface of a confection, usually although not necessarily in the freshly applied coating thereof, by the use of an element which contacts with such surface. A working of the coating is effected in forming the decorative markings,—as distinguished from forming the markings entirely by depositing strings of coating material on the confections in various decorative forms by means which do not contact with the confections.

The invention, in its broadest aspect, is characterized by the use of a rotating decorating tool of any suitable type, which tool, while engaged with the plastic surface of a confection, is rotated and at the same time bodily shifted relatively to said surface, for the purpose of working the plastic material of the confection into decorative markings in the nature of strings, ridges, furrows, grooves and the like.

As an additional feature, the decorating tool is rotated, preferably positively, at a peripheral speed in excess of the speed of that of the relative bodily shifting movement between the tool and engaged confection, with the object in view of drawing out the coating, as distinguished from merely forming prints of the tool in the coating.

As a further and most desirable feature, the decorating element or tool, while rotating about its own axis, is engaged with the plastic surface of the confection and caused to roll along or around the confection. The action may be likened in a rough way to the manner in which a pinion rolls along a rack, or a planet gear rolls around a sun gear, although the engaged tool and confection, unlike the engaged gear elements, may and usually do have a considerable amount of relative slip, much as a wheel would slip in muddy soil.

For decorating the sides of confections, the tool is usually caused to make at least one and, preferably a plurality of complete courses or circuits around the periphery or perimeter of the confection and, in so doing, portions of the coating are drawn out to form decorative markings. These are not merely the tracks of the rotating tool but distinctive markings, which seldom bear any close resemblance to the pattern of the tool used in forming them. The decorations formed are particularly attractive because of the complete lack of any earmarks indicative of their formation by the use of a tool. One can make decorations of a striking and unique character, which could not readily be reproduced by ordinary hand methods, where the operator uses her fingers to manipulate the coating into decorative markings.

The above method features, while capable of being carried out by hand, are usually and desirably carried out by automatic mechanism and preferably, although not necessarily, in conjunction with a confection coating machine.

The invention also has for an object the provision of automatic mechanism for carrying out the several features above set forth.

The apparatus in its simplest form includes a rotatable decorating tool and means whereby the tool, while rotating, may be bodily moved over, along or around the plastic surface of a confection.

In a desirable and preferred form of apparatus, the rotary decorating tool is suspended by its driving spindle which is either in itself flexible, or includes flexible connections, enabling orbital or other movements of the decorating tool in addition to its rotative movement, when engaged with the confections.

Usually and desirably, although not necessarily in all cases, the confections are carried by a conveyer, such as the coating machine conveyer, which moves them successively into contact with the decorating tool. In one arrangement, the tool becomes engaged with a side surface of the confection and, when this engagement occurs, the rotating tool will spin several times around the periphery or perimeter of the confection, draw out the coating and work it into a decorative marking, then free itself and spring into engagement with the next succeeding confection.

The apparatus is not confined, however, to use in decorating the sides of the confections for, although very useful and desirable for such purpose, it can be used with effectiveness to ornament the top surfaces of confections. Neither is the invention entirely confined to the use of suspended decorators, which extend downwards toward the confection carrying conveyer, although that is the arrangement which I now prefer and consider best suited for the work.

The invention also has for other objects, means for adjusting the decorating tool toward and from the conveyer or other support for the confections to be decorated to effect variations in the decorations produced, means for adjusting the decorating tool transversely with respect to said support for similar and other reasons, means for aligning the confections on the conveyer so as to be properly engaged by the decorators, and means for effecting variations in the speed of the rotatable decorating tools for the purpose of varying the character of decorations produced.

Other objects will appear as the detailed description proceeds and will be particularly pointed out in the appended claims.

The invention will be disclosed with reference to the accompanying drawings, in which:—

In the practice of my method of decorating confections, use is made of a decorating element or tool which is engaged with the fresh coating or plastic outer surface of a confection, rotated while thus engaged and at the same time bodily shifted relatively to said surface. In a preferred arrangement, the engagement of the tool with the confection is such that the tool will roll along or over or around a surface of the confection and, by disturbing and preferably positively working the plastic surface thereof, form decorative markings. The action may be likened in a rough and general way to the manner in which a rotating pinion would travel along a rack or to that in which a revolving planetary pinion would roll around its central "sun" gear, although since the tool and confection are held in engagement merely by the plastic and viscous coating, there may be and preferably is, relative slip between the two which would not be present in the example given. In fact, in many cases, as will later appear, it is desirable to have a considerable amount of slip because a greater degree of working and drawing out of the coating results. The amount of slip will, however, vary under different conditions. It is to some extent dependent on the particular construction and type of decorating tool used, but there are other factors having a bearing on the amount of slip, as will be later described. A wide variety of decorating tools may be used, as will later appear.

Figures 5, 6, 7, 8:
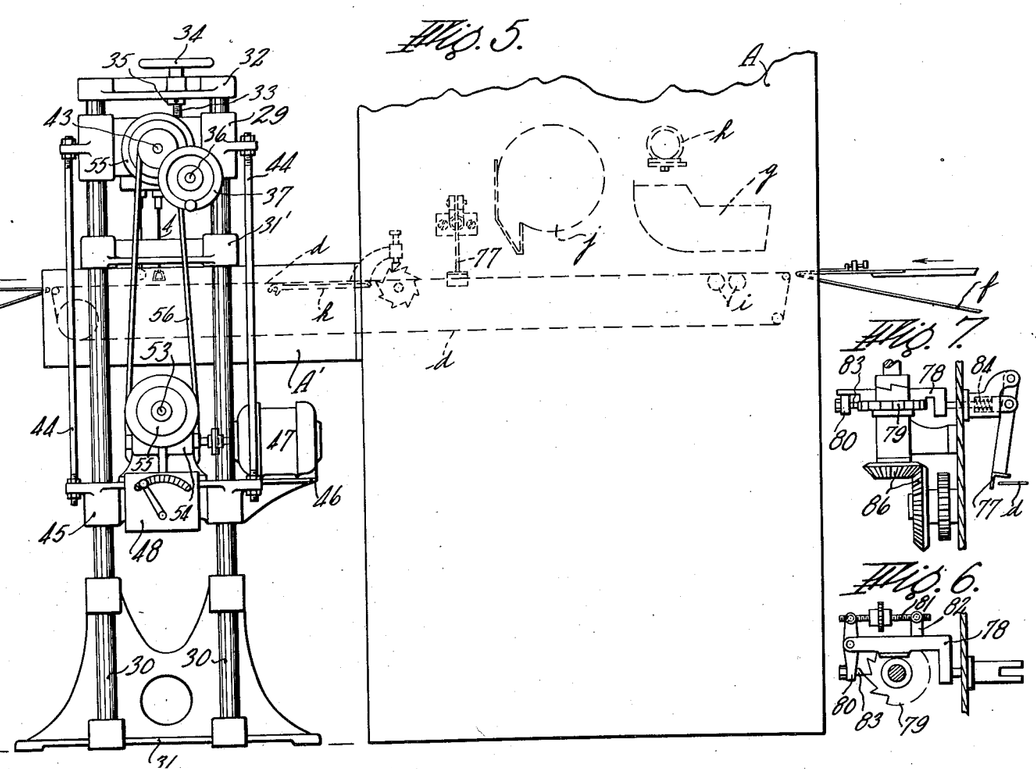
Fig. 5 is a view, taken at right angles to Fig. 1, showing the decorator and coating machine,—the latter being in part broken away and in part shown in conventional form.
Figs. 6 and 7 are plan and elevational views, respectively, of a means for laterally shifting confections on the conveyer of the coating machine to align them with the decorating tools.
Figs. 8 to 15 inclusive, are views illustrative of successive steps in the decoration of a confection by the method of my invention.
Figures 8, 9, 10, 11, 12, 13, 14, 15, 16, 17, 18, 19, 20, 21:
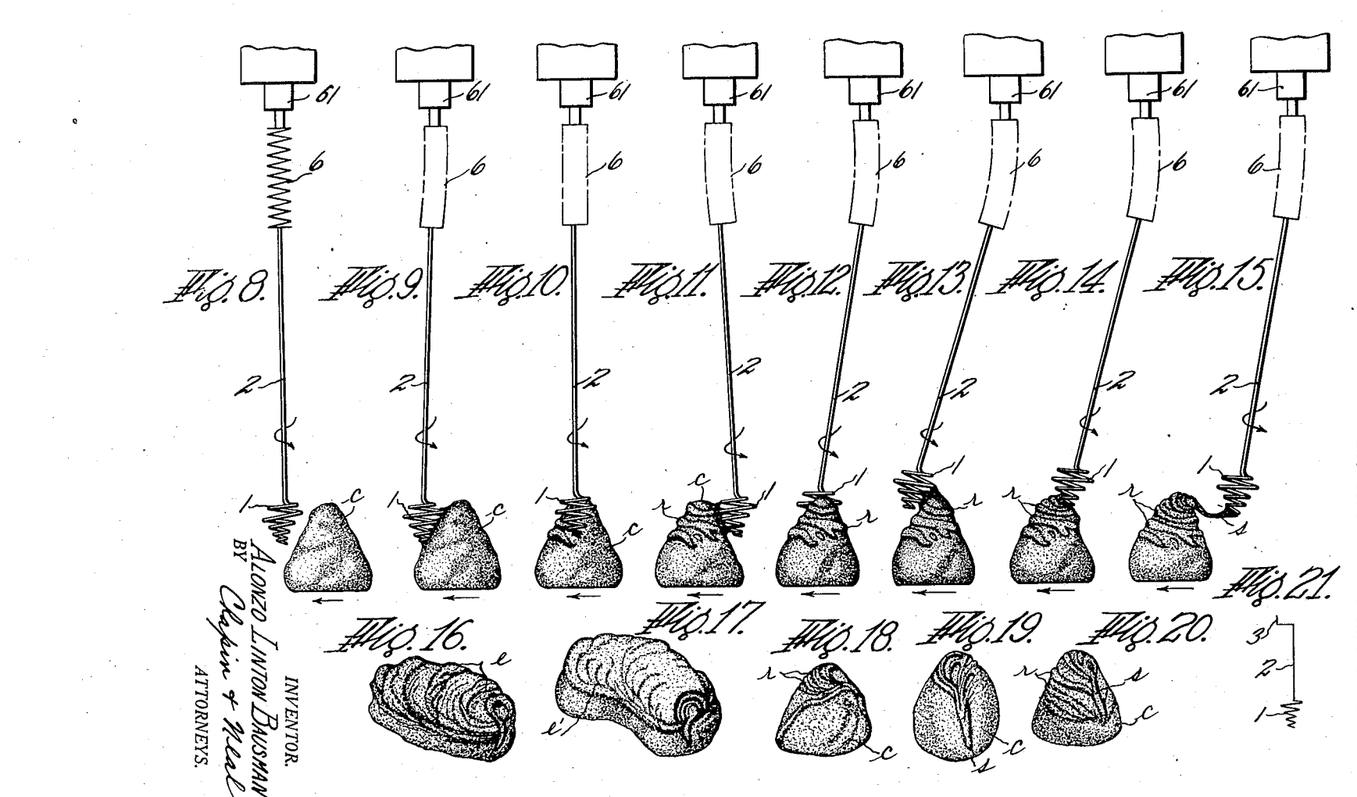
Figs. 16 and 17 are perspective views illustrative of one type of decoration which can be formed on the top surfaces of more or less flat confections.
Figs. 18 to 20 are similar views illustrative of one general style of decorations which can be formed on the side surfaces of more or less conical shaped confections.
Fig. 21 is an elevational view of a hand operated decorating tool for practicing my method.
Figure 22:
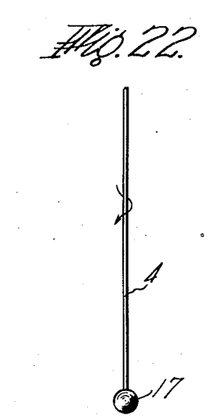
Figs. 22 to 26 inclusive, are elevational views showing various kinds of decorating tools.
Figure 23:
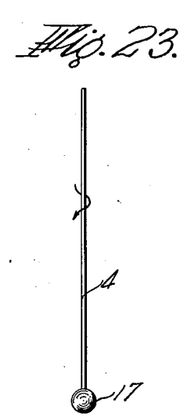

Considering a specific example, such as the decorating tool shown in Fig. 8 in the shape of a conical spring 1, and the manner in which the method might be practiced by hand, this tool is rapidly rotated about its own axis and, while rotating, it is engaged with the side surface of a freshly coated confection c. Consider that the tool 1 is fixed to the lower end of a spindle 2, such as a piece of flexible and springy wire, for example. For hand work, the upper end of the wire might be bent, as shown in Fig. 21, to afford a crank handle 3. The operator, holding the wire, at a point near its upper end, loosely between his fingers and at the same time rotating the wire about its own axis (by turning the handle 3 or in any other suitable way), moves the tool 1 relatively to confection $c$ until the two are engaged. The tool then sticks to the plastic coating of the confection, as indicated in Fig. 9. Since the tool clings to the confection and is rotating, it is forced to travel around the periphery or perimeter of the confection, as the case may be, in an orbital or other analogous path,—the wire 2 flexing to permit the action much in the manner shown in Figs. 10 to 14 inclusive. The tool may be made to travel only part way around the confection but usually, and preferably, it is caused to make one or more complete circuits. It may thus be engaged with the confection a number of times and at a number of different points or locations. The particular tool shown will form decorations which are more or less close approximations to spiral flutes. Since the tool is a spiral spring, it tends to climb up on the confection while travelling around it, and the result is the formation of a number of spirally disposed ridges $r$ drawn out from the plastic coating by the convolutions of the spring 1. The action may be allowed to continue until the tool 1 draws out a strong, such as $s$, (Fig. 15) and until this string is broken by the tool pulling away from the confection under the force of its stressed springy spindle 2. Typical specimens of confections decorated in this way and by the tool described are shown in Figs. 18, 19 and 20.

Figures 1, 2, 3, 4:
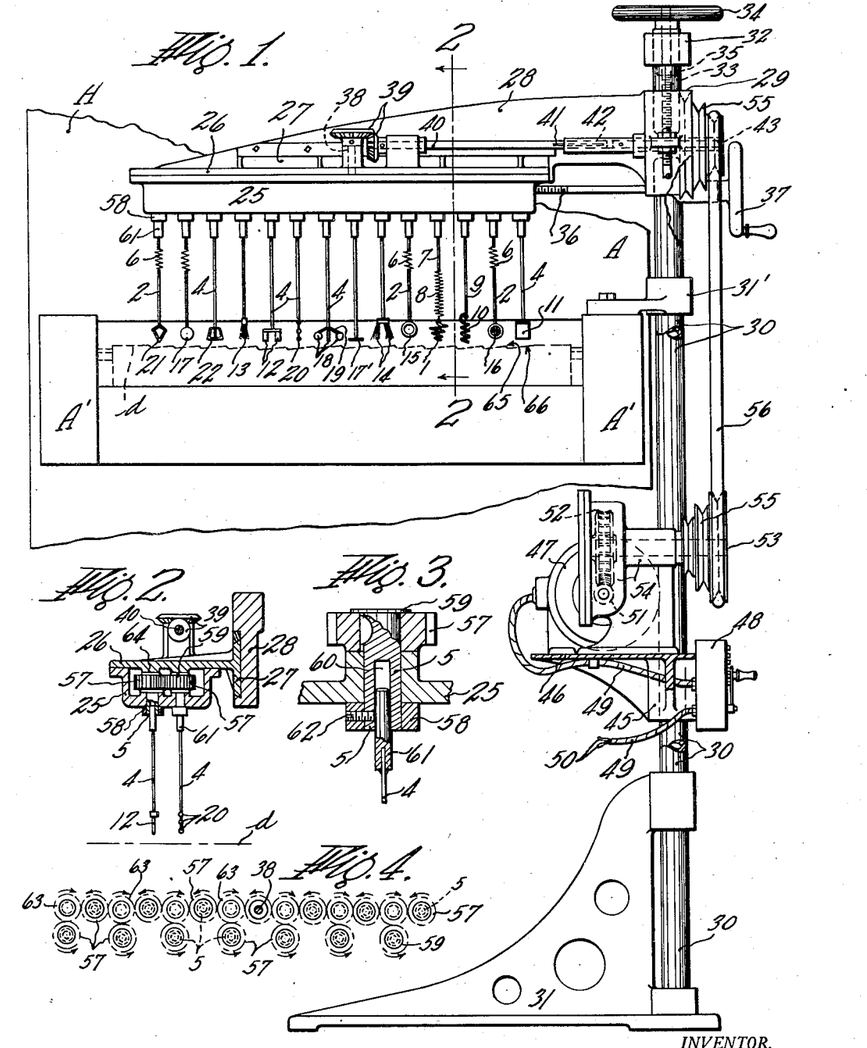
Fig. 1 is an elevational view of a decorating apparatus embodying my invention, such apparatus being shown in conjunction with the delivery end of a confection coating machine.
Fig. 2 is a sectional view taken on the line 2—2 of Fig. 1.
Fig. 3 is a fragmentary sectional view, taken similarly to Fig. 2 but drawn to a larger scale, and showing the detail of the mounting of the drive shaft for one of the decorating tools.
Fig. 4 is a diagrammatical plan view illustrative of a means for driving a series of decorating tools arranged in staggered relation in a transverse series.

The method is generally carried out automatically and usually in conjunction with a confection coating machine, such as that conventionally shown in part at A in Figs. 1 and 5. One or more decorating tools, usually a plurality, are arranged in one or more transverse rows and suspended over the delivery end of the conveyor $d$ of the coating machine in position to be successively engaged by the confections as they pass. The action, in such a case, is illustrated in Figs. 8 to 15 inclusive. The confection $c$, travels continuously and horizontally in the direction of the arrow. The decorator 1 is flexibly suspended in the path of the travelling confection and is rotating, all as indicated in Fig. 8. A side surface of the travelling confection eventually engages the decorator, as shown in Fig. 9 and the viscous coating of the confection adheres to the decorator. The latter, being rotated rapidly, rolls around the confection $c$, much like a planet gear would roll around its central sun gear, except that it slips much as a wheel would slip if rotating in muddy soil. It may, under some conditions, spin to a considerable extent much as a mired wheel would. The decorator thus has rotation about its own axis and also bodily movement in an orbital or analogous path. Figs. 10, 11, 12 and 13 show several positions of the decorator during its orbital travel and show also progressive steps in the formation of the spiral ridges $r$ and intervening flutes. These figures do not, however, show successive steps in one and the same revolution of the tool. These figures also illustrate how the decorating tool, whether of this particular type or any other type, will climb up on the confection during its orbital travel (compare Figs. 10 and 14). The decorator will make one or more complete circuits around the confections,—usually at least two or three and sometimes many more,—dependent on the speed of rotation of the decorator, the speed of travel of the confection, and other factors later to be discussed. Eventually, the decorator will break loose from the confection and move into engagement with a succeeding confection. This usually occurs in the following way. The confection, by its linear motion, causes the decorator supporting spindle 2 to be flexed more and more away from the normal vertical position which it tends to assume. In so doing, the decorator is forced to rise and climb up on the confection. Also, when the spindle is flexed sufficiently, a force is built up to overcome the hold of the viscous coating on the decorator and the latter snaps free from this confection, usually from the back side thereof (with respect to the direction of travel of the confection) and into engagement with the front side of the next succeeding confection. The decorator then spins around such confection a number of times and snaps free and into engagement with another and so on. In the illustrated case, the decorator is shown as about to pull away from the confection in Fig. 14 and, in Fig. 15, as having drawn out a string $s$ practically to the breaking point. This string drops back on the confection and forms part of the decoration (see Fig. 20).

It is not essential for all purposes that there be relative linear movement between the decorator and confection although such an arrangement is most desirable and at present preferred because of its simplicity and the very satisfactory results which have been obtained by it. Another advantage, incident to the arrangement, is in the automatic transfer of the decorator from one confection to another without the necessity of special means for the purpose. The confections simply need to be properly located laterally on conveyor $d$ so as to engage the decorator and the latter will successively engage and spin around each in turn. The confections, if at rest while being decorated or relatively so, insofar as relative linear motion with respect to the decorators is concerned, would have to be positioned relatively to the decorators longitudinally as well as laterally in order to allow the decorators to act. This can be done and decorations produced in accordance with the teachings of this invention but more elaborate mechanism is necessary for the automatic practice of the invention in this manner.

The invention is equally suitable for confections other than those of circular cross section. The decorating tool will travel around the perimeter of a square or rectangular confection in much the same general way and produce decorations in the side surfaces thereof. Neither is the invention confined to use in decorating the side surfaces of confections. The same tool, shown in Fig. 8, will form decorations on the top surfaces of more or less flat topped confections. The decorations shown in Figs. 16 and 17 were formed with such tool. Other examples of confections, decorated on the tops by the method and apparatus of this invention but with tools differing from that of Fig. 8, are shown in Figs. 27, 28, 29 and 30.

With reference to Figs. 16 and 17, the decorating tool 1 originally traveled completely around the perimeter of the confection but as this piece advanced, the orbital path of the tool became tilted, being higher when engaged with the front part of the confection and lower when engaged with the rear part thereof. The reason for this will be clear from a comparison of Figs. 13 and 15, wherein the decorator 1, when engaged with the front side of the confection is higher than when engaged with the back side thereof. The yielding support for the decorator flexes more under the first condition than under the second condition. Therefore the tool 1 will rise when it swings toward the front and advancing side of the confection and fall as it moves toward the rear side thereof. The decorations shown in Figs. 16 and 17 are the result of such tilting of the orbital path of the decorator. After the confection had advanced far enough, the decorator, in its movement toward the front of the confection, was forced to travel up over the top of the confection and then down over the side. As the confection continued its advancing movement the orbital paths of the decorator became shorter and shorter (in the direction of movement of the confection). The result is that decorations, such as those shown at $e$, are formed on the tops of the confections. The decorations $e'$, shown in Fig. 17, were formed in the same general way except that the decorator revolved at slower speed that it did in making the decorations shown in Fig. 16.

The character of the decorations, it will be seen, vary widely in these two cases and this applies generally to all decorations formed by the method of this invention. Variations in the speed of rotation of the decorator as well as variations in the speed of linear travel of the confections will effect variations in the character of the decorations produced. So also, variations in the temperature and viscosity of the chocolate or other coating of the confections, or in the plastic outer surface of an uncoated confection, will effect wide variations in the character of the decorations. Not only is the temperature of the chocolate or other coating in the coating machine A a factor to be considered, but so also the temperature of the surrounding air, adjacent the location where the decorations are made, and the length of time elapsing between the coating and decorating are factors, both having a cooling influence on the coating. The kind of coating, whether chocolate or otherwise, is also a factor and the particular make up of any one coating, such as chocolate, for example, may also be a factor affecting the nature of the decorations produced.

The decorations produced are usually not in any strict sense counterparts of the tools used. They will vary widely with the kind of tool used but the pattern of the tool is not ordinarily reproduced in the decorative markings. This is because the tool slips to a considerable extent in rolling and a substantial degree of working and drawing out of the coating results. Sometimes, the decorations will have some traces of resemblance to the tool which forms them. For example, the confections shown in Figs. 12 to 15 have more or less spirally located ridges $r$. These ridges, although of a generally spiral nature, do not, however, correspond with the spiral convolutions of the forming tool and are not true, or even close counterparts thereof. These ridges were not formed by one complete circuit of the tool around the confection but by several such circuits. Consequently, if the ridges were simply the marks left by the spring, there would be a large number of them,— say at least fifteen or twenty,—whereas there are only three or four in the example shown. One cannot predict with any degree of accuracy the nature and style of decorations that will be produced by a given type of tool because the tool is not carefully rolled over the confection surface without slipping, so as to leave true tracks or prints of its pattern. The character and style of the decorations is a matter to be determined by trial and, even then the results will vary widely under various conditions for the reasons above set forth. The decorations, however, are the more attractive on this account as they are distinctive and sharply differentiated from those obtained by the use of conventional patterns.

Figure 26:
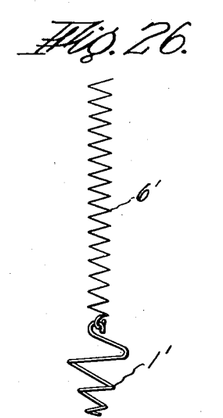

Referring now to the mounting of the decorating tool or tools, this may be accomplished in any suitable way and various ways will readily occur to those skilled in the art. I have shown herein, by way of illustrative example, merely one general plan of mounting which I now consider to be the best and therefore prefer. The principal features of this mounting are that the tool is rotatably supported, with freedom to move in an orbital or analogous path. The simplest expedient is to fix the decorator to one end of a flexible and springy wire, such as 4 (Fig. 1), and fasten the other end to a rotary shaft 5 (see Fig. 3). Many detailed variations of the general plan will readily occur. Thus, the spindle of the decorator may be comparatively rigid, or at least reliance may not be placed on its flexibility, as in the case of the spindle 2 (Figs. 1 and 8). Here, the spindle is connected to the rotary shaft 5 by means of a coil spring 6 or by any other means which will afford the equivalent of a universal joint. With a true universal joint, the weight of the decorator would be relied on to supply a force equivalent to that of the coil spring 6 when flexed. The spring is preferred on account of the cheapness and simplicity of construction but I recognize that various means of an equivalent nature may be used for the purpose. The spring may likewise be located just above the decorator, as in the case of the spring 8, shown in Fig. 1, as connecting the decorator 1 to the lower end of a spindle 7. Again the spindle may be a more or less rigid one as shown at 9 and the decorator 10 pivotally connected to its lower end. Still another expedient is to connect the drive shaft and decorating tool solely by a spring such as 6' (Fig. 26). All these arrangements, I consider to fall within the scope of the term "flexible drive shaft." So also, the decorators may in themselves possess flexibility, as in the case of those marked 11 and 12 in Fig. 1, which are strips of flexible material, such as cloth, resembling flags, or as in the case of those marked 13 and 14, which are brushes.

The decorators may be of various shapes, materials and construction as will be apparent from what has already been described. An almost endless variety of tools can be used and it is not feasible to illustrate and describe more than a few examples. In Fig. 1, I show an array of different tools which I have used and found suitable. Aside from those already described, these are,—a single ring 15, a pair of rings 16 crossed at right angles, a ball 17, a round disc 17', a series of round discs 18 angularly distributed around and radiating from the spindle 4 and carried one on the end of each of a series of arms 19, a series of flexibly connected balls 20 disposed in longitudinally spaced relation to the spindle 4, a wire bent into the form of a sector 21, two trapezoidal shapes 22 crossed at right angles, and an ordinary coil spring 10. Enough has been shown to indicate that the decorators may be of any suitable type and that a wide variety of types are suitable for the work. Generally speaking, it is desirable that the decorators be of light weight in order not to sink too deeply into the coating and, in operation, scrape the coating off exposing the bare center. Aside from this, the material, construction and shape of the decorators do not matter much except insofar as they afford wide latitude for variety in the decorations produced.

Referring now to the exemplary apparatus, herein disclosed by way of illustrative example, the drive shafts 5 are rotatably mounted, with their axes vertically disposed, in the lower wall of a box like housing 25. The latter is secured to, and its upper end closed by a member 26 which has fixed thereto a dovetail slide 27 mounted, as indicated in Fig. 2, for horizontal sliding movement in ways formed in an arm 28. This arm has an integral part 29 which is mounted for vertical sliding movement on two vertically disposed rods 30, fixed at their lower ends to a pedestal or floor stand 31. These rods may be further secured by a bracket 31', which encompasses these rods and is bolted to the extension part A' of the frame of coating machine A. The upper ends of rods 30 are tied together by a cross piece 32, fixed to each rod. Any suitable means may be provided for moving the member 29 on its guideways 30. For example, a screw 33 may be threaded into member 29 at its lower end and at its upper end rotatably mounted in member 32 and held against axial movement therein by a hand wheel 34 and collar 35. By turning the hand wheel 34, member 29 and thus arm 28 and all the decorating tools, may be raised or lowered with respect to the underlying confection carrying belt d. A screw 36, similarly mounted at one end in member 29 and carrying a handwheel 37, may be threaded, as indicated in Fig. 1, into housing 25. By turning handwheel 37, the housing 25 may be moved horizontally with respect to arm 28 and all the decorators moved laterally with respect to belt d.

For driving the decorators, I have shown a vertical shaft 38, mounted in cover 26 and driven by bevel gears 39 from a horizontal shaft 40, also rotatably supported near one end from the cover. The other end of shaft 40 is slidably and rotatably engaged, as by a feather key 41, with a sleeve 42 fixed to a shaft 43, rotatably supported in the member 29. The parts 40, 41, 42 and 43 afford a telescoping drive shaft, enabling horizontal movement of the housing 25 on its supporting means 28 and 29. The member 29 is connected by tie rods 44 to a similar member 45, disposed below it and slidably mounted on rods 30 (see Fig. 5). Member 45 carries a table 46, on which is mounted an electric motor 47. This motor is preferably of the variable speed type and I indicate a rheostat 48 for effecting variations of its speed. This rheostat may be carried by members 45 and the rheostat and motor 47 are properly connected by wires contained in flexible conduits 49 and indicated in part at 50. The motor 47 drives through a worm 51 and worm gear 52, or any other suitable transmission, a shaft 53 mounted in the housing 54, which encloses the transmission and which is fixed to table 46. The outer end of shaft 53 and the outer end of the shaft 43 carry stepped pulleys 55, connected by a belt 56. By shifting the belt 56 from one step to another of the pulleys 55, the speed of shaft 40 may be varied. Variations in speed may likewise be effected by the rheostat 48. The particular driving mechanism disclosed is given merely by way of an illustrative example of one suitable means for driving the decorators and for varying the speed thereof to produce different styles of decorations.

Referring now to Figs. 2 to 4, each shaft 5 has fixed to its upper end a gear 57. Each of these shafts is held in place by a collar 58 engaging the lower wall of housing 25. Each shaft 5, as shown, has a flange 59 on its upper end to overlie its gear and its lower end is bored out forming a socket 60 to receive a shank 61, which is removably held in place in the socket by any suitable means. As shown, the shank 61 is held by the same set screw 62 which serves to hold collar 58 to shaft 5. The various spindles, such as 2, 4, 7 and 9, are suitably fixed in shanks 61, as indicated. For convenience, the shafts 5 are arranged in staggered relation in a transverse series, as shown in Fig. 4, to avoid the close spacing which would otherwise result if all the shafts were aligned in one transverse row. This is particularly desirable where the decorators move in orbital paths to avoid interference between adjacent decorators in operation. Each gear 57 is driven from the adjacent gear through the intermediary of an idler gear 63. The gear train is clearly shown in Fig. 4. As will be seen, each gear which drives a decorator, will turn in the same direction. The idler gears may be mounted in exactly the same way as that in which the other gears are mounted. The spindles of all the gears may be held against upward movement by bosses 64 on cover 26, which bosses engage the flanged upper ends 59 of the shafts. One of these shafts has an upward extension, shown in section in Fig. 4, which constitutes the drive shaft 38, heretofore described.

The confection coating machine, in conjunction with which the decorator is usually used, may be of any suitable type. A standard, well-known type has been conventionally illustrated. It includes a pervious conveyer $d$, such as one made of wire mesh, to which the confections are fed in any suitable way, as by the feed belt $f$. The usual flow pan $g$, to which chocolate or other coating is suitably supplied, as from the conduit $h$, delivers a downward stream of coating upon belt $d$. The confections are enveloped by this stream and coated as they pass therethrough. The bottoms of the confections are coated in the usual way by rolls $i$. Superfluous coating is removed by the fan $j$ and any wrinkles left in the coatings due to the action of the fan are smoothed out by an up and down vibrating movement of belt $d$ caused by the usual rapper $k$. The confections, shortly after coating, are carried by belt $d$ to the decorator, above described, and after decoration, to a delivery belt $l$ which conveys them to any suitable cooling means. The arrangement, in all broad essentials, is like that shown in U. S. Letters Patent to Magniez, No. 735,890, granted August 11, 1903. Further and detailed description of the coating machine is not necessary for an understanding of the invention.

It is, however, necessary to provide in connection with the coating machine some suitable means for locating the confections laterally on belt $d$ in proper positions to be engaged by the decorators. As an illustrative example of one of many means, which will be suitable for the purpose, I show the belt $d$ constructed with a series of laterally spaced shoulders 65, one for each row of confections on the belt, after the fashion disclosed in U. S. Letters Patent to Kihlgren, No. 1,009,670, granted November 21, 1911. The belt also includes inclined, confection-supporting parts 66, sloping downwardly towards the adjacent shoulders. By tapping belt $d$ along one side edge (the left as viewed in Fig. 2), the confections are caused to slide down the inclined parts 66 and bring up against the shoulders 65, whereby they are properly lined up for engagement by the decorators.

While the confections may be thus moved into position by various means, the means shown in Figs. 6 and 7 will suffice for illustrative purposes. A lever 77 is pivoted at one end to casing A with its lower end disposed adjacent to belt $d$. A member 78, mounted in casing A to slide horizontally, is pivotally connected at one end to lever 77. Near its other end, this member rests upon the face of a ratchet wheel 79 and at such end carries a lever 80. The position of the latter is adjustable by a screw 81, which has right and left threaded portions engaging, respectively, in one end of lever 80 and a lug 82 on slide 78. The other end of the lever carries a pawl 83 to engage ratchet 79. A spring 84 holds the pawl in engagement with the ratchet. This ratchet is driven through bevel gears 85 from one of the driven shafts 86 of the coating machine. Consequently, the lever 77 will be vibrated and caused to periodically tap the edge of belt $d$ for the purpose above described. The extent of tapping imparted to belt $d$ may be varied by adjustment of screw 81.

The general operation will be clear from the foregoing description. Coated confections, properly aligned laterally on belt $d$ by any suitable means, such for example as that shown in Figs. 6 and 7, are fed in rows to the row of revolving decorating tools. The tools in such row may be all of the same kind or of various kinds. The latter arrangement is frequently desirable, especially where the confections are packed in boxes in much the same order as they are delivered from belt $d$, because confections, having a variety of decorations, are then always available. The confections, at a time while their coatings are still plastic and workable, are engaged by the decorating tools and these coatings worked into decorative configurations. The results which follow will vary according to the kind of tool used, its rotative speed, the speed of linear travel of the confections, and the plasticity of the coating at the time of decoration. So also, the results may vary according to the position of the decorators vertically and laterally with respect to the confections.

It is manifestly not feasible to describe in detail each type of the almost endless variety of types of decorations that can be produced by various sorts of decorating tools, mounted and operated in accordance with this invention. Specific examples have been above described in connection with Figs. 8 to 20, inclusive. It has been shown that the invention can be used to form decorations on the sides or on the tops of confections, that the decorator is effective irrespective of the shape of the piece and will travel around substantially oblong confections as well as round ones, and that the decorations produced will vary with the speed of the decorating tool. The widely varying decorations shown in Figs. 16 to 20 all resulted from the use of one type of decorating tool. In each of these cases, the tool engaged the side of the confection. However, this side engagement is not essential in all cases, nor is the resulting encircling of the confection by the tool in its orbital movement essential in all cases. The decorations shown in Figs. 27 to 30 were formed by the use of the tools shown in Figs. 22 to 25, respectively. These were adjusted high enough above belt $d$ so as not to engage the sides of the confections, or at least not to an extent sufficient to cause the tool to travel around the confections. The tool merely engaged the top coatings thereof.

Figure 27M:
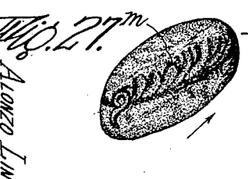
Figs. 27 to 31 inclusive, are perspective views illustrative of the decorations formed by the tools shown in Figs. 22 to 26, respectively.
Figure 28M:
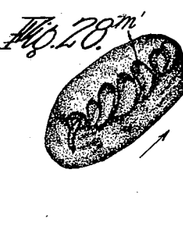

Considering Figs. 27 and 28, an interesting feature of the decorations there shown is that they are located substantially all on one side of the longitudinal center line of the confection. They were produced by the use of the ball 17 (Figs. 22 and 23) rotating in the direction indicated by the arrows. The confections traveled in the direction indicated by the arrows in Figs. 27 and 28. Orbital movements of the ball caused the arc-shaped ridges $m$ and $m'$ but the orbital movements were confined wholly to the top surface of the confection and did not extend to the sides thereof, as in the case of the confections shown in Figs. 16 and 17. The unbalanced arrangement of decorations resulted. The ball 17 traveled in a clockwise direction (as viewed when looking down on top of the confection). In one half of its orbit, the ball traveled more or less in the same general direction as that in which the confection moved, while in the other half of its orbit, it traveled more or less in a direction opposite to that in which the confection traveled. There was a much greater degree of relative movement between the tool and confection in the last named part of the orbital travel than in the first named part and this is probably the reason for the unbalanced disposition of the decorations.

Another example of the effects resulting from variations in rotative speed of the decorators is seen in Figs. 27 and 28. The ridges $m$ of Fig. 27 are more numerous and less pronounced than are the ridges $m'$ of Fig. 28 but the decorator revolved more slowly in forming the decorations $m$ than in forming the decorations $m'$. While it is difficult to formulate with certainty any general rules, I believe that for flat-topped confections, more clearly cut and more attractive decorations are formed by using the relatively higher speeds and that for cone shaped confections or other similar ones requiring side decorations, the reverse is true. That is, more clearly cut and more attractive decorations appear to be produced at relatively slower rotative speeds of the decorator. Other factors being equal, the degree of slip between the tool and confection increases with the speed and, where there is a considerable degree of slip, more attractive decorations are secured. If there were no slip, the decorations would be little more than the tracks of the tool. Slip therefore means a relative movement between the tool and coating, and a resulting working of and drawing out of the latter. At the same time, too much speed will tend to throw the tool away from the confection, especially where the tool is spinning around it as in Figs. 10 to 15, which probably explains why better work is secured in such cases at the relatively slower speeds. Slip can be reduced by using tools such as 16, 18 and 22, which, roughly speaking, become to a certain extent "geared" to the confection.

Figure 24:
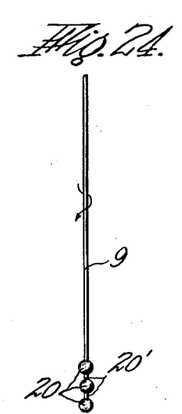
Figure 25:
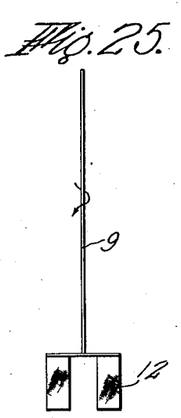
Figure 29:
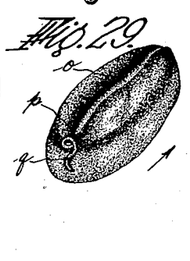

The orbital travel of the decorating tools is not essential in every case and, as an example of one exception, reference is made to Fig. 29, wherein a central groove $o$ was formed longitudinally in the top coating of the confection by the use of the tool shown in Fig. 24. This is nothing more than a short length of chain, such as is used in electric lamp sockets of the pull chain type. The balls 20 are flexibly connected by links 20'. The spindle 9 was set low enough so that all three balls 20 were engaged by the advancing end of the confection. As the confection advanced, these three balls became laid down on top of the confection in a roughly horizontal line and were dragged through the top coating from one end of the confection to the other. But, as they were thus dragged, they were also rotating. This results in the formation of a clear cut groove which is distinctively different than would result from a mere dragging action of the decorator, without rotation. The action may be likened in a rough and general way to that of a revolving milling cutter which is axially moved along the work. The coating is thrown up in a direction at right angles to the direction of dragging movement. The coating is not dragged longitudinally to any considerable extent until the tool reaches the rear end of the confection, when a short longitudinal ridge $p$ is formed which is drawn out into a string $q$ in the act of disengaging the decorator from the confection. It will thus be seen that attractive decorations may be formed by the rotating decorating tool, even though it does not have orbital movement and even though the axis of rotation of the tool itself is not substantially normal to the confection support. There is here, as in all other cases, a bodily shifting of the decorator over the surface of the confection while rotating.

Figure 30:
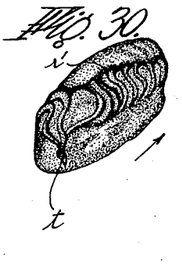

Decorations may likewise be formed by the rotary decorating tool, when supported and driven by means which lack the flexible connection heretofore described. Consider Fig. 25, wherein the axially offset "flags" 12 are carried by a spindle 9 which need not flex in operation. These flags 12 move in an orbit about the axis of spindle 9 without individual rotation of each about any other axis. Each describes an orbit relatively to the top surface of the confection but this is due to the axially offset location of the decorators. These flags 12 which are of flexible material, were vertically adjusted so as to be slightly bent when engaged with the top surface of the confection. The resulting decorations are shown in Fig. 30, in the shape of flutes $r'$ of peculiar formation, most of which have at opposite ends reversely turned bends. The decorations as a whole lead diagonally across the top of the confection, starting at one corner of the advancing end of the confection and covering the greater part of the top surface at the rear end thereof, and terminating with a string $t$.

Figure 31:
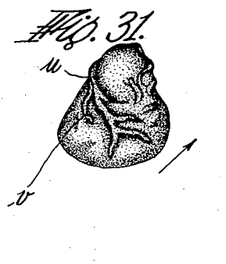

In Fig. 26, a decorator 1', in the shape of a wire bent rather roughly into helix form, is suspended and driven from shaft 5 solely by a spring 6'. A great degree of flexibility in the driving and supporting means for the decorator is thus obtained. The result is quite strikingly different from that obtained by the somewhat similar tool 1 of Fig. 8 and, as shown in Fig. 31, a main ridge $u$ is formed which is located roughly spirally on the confection and which has a number of diverging branches $v$ of irregular form.

The decorating tools and the decorations formed by them, as above described, are but a few examples of a large number and wide variety which are available. Enough has been described to indicate the wide scope of the invention, in the sense that a wide variety of tools which can be used; that there are a variety of ways in which one tool can be used; that there are various ways in which the tools can be mounted with respect to flexibility of support, location of axis of rotation relatively to the confection and the way in which the rotating tool is bodily shifted relatively to the confection while rotating. In each example, there is such a bodily shifting of the tool with respect to the confection, while the tool rotates and works the coating. This shifting may be effected by the linear movement of the confection alone, by orbital movement of the decorator alone or by a combination of both. The linear movement of the confections, while being decorated, is not necessarily essential except where such movement is solely relied on to cause the bodily shifting of the decorator relative to the confection.

Thus, while I have disclosed my invention in the principal forms which I now consider the best suited for the work, I recognize that the invention, in its broad essentials, may be embodied in many other forms which differ widely from those herein disclosed. Therefore, since I believe myself to be the first to decorate confections and the like by the method and apparatus set forth herein, I desire to claim my invention in the broadest possible legal manner.

What I claim is:

1. The method of decorating confections which consists in engaging a rotating decorating tool with the plastic surface of a confection, bodily shifting the tool over the surface while rotating, and rotating the tool at a peripheral speed in excess of the speed of bodily shifting movement.

2. A confection decorating apparatus, comprising, a confection support, a shaft rotatably supported at a point above said support, a decorating tool, means by which said tool is suspended from and driven by said shaft and enabling the axis of revolution of the tool to travel in orbital paths, and means for effecting relative movement between said confection support and tool to engage the latter with the confection to be decorated.

3. A confection decorating apparatus, comprising, a support for a confection, a spindle rotatably supported at a point above said support and extending toward the same, a decorating tool carried by said spindle at a point remote from the spindle support, means for rotating said spindle, and means for effecting relative movement between said confection support and tool to engage the latter with the confection.

4. A confection decorating apparatus, comprising, a support for a confection, a flexible spindle rotatably supported at a point above said support and extending toward the same, a decorating tool flexibly connected to said spindle at a point remote from the spindle support, means for rotating said spindle, and means for effecting relative movement between said confection support and tool to engage the latter with the confection.

5. The combination with a conveyer of freshly coated confections, of an overlying support, a drive shaft rotatably mounted therein with its axis in non-parallel relation with respect to the plane of travel of the confections, and a decorating tool flexibly suspended from and driven by said shaft and located in the path of travel of said confections.

6. Apparatus for decorating confections while their outer surfaces are plastic comprising, a rotatable decorating tool, a flexible drive shaft by which the tool is suspended with freedom to move in orbital paths, and means for feeding confections one after another into engagement with said tool, whereby the rotating tool travels around the engaged confection and forms decorative markings in its plastic outer surface.

7. Apparatus for decorating confections while their outer surfaces are plastic comprising, a rotatable decorating tool, a springy flexible means by which the tool is suspended and rotated with freedom to move in orbital paths, and conveying means for carrying the confections one after another into engagement with the suspended rotary tool, the tool when engaged with a confection travelling around the same while rotating about its own axis, the linear movement of the confection while engaged with the tool serving to deflect said flexible means and the springy character of such means eventually causing the tool to be disengaged with said confection and moved into engagement with a succeeding confection.

8. The method of decorating a confection, while its outer surface is in a plastic state, which consists in establishing yieldable contact of a rotating decorating tool with the plastic surface and adhesion therebetween and bodily shifting the rotating tool over such surface while maintaining yieldable contact therewith to form the plastic surface by mechanical working thereof into decorating configurations.

9. The method of decorating a confection while its outer surface is in plastic and workable condition, which consists in establishing yieldable contact and adhesion between a flexibly supported rotating decorating tool and a side surface of the confection and bodily moving the rotating tool and causing it to follow around the perimeter of the confection while maintaining the contact by the adhesion to mechanically work the surface into decorative configurations.

10. The method of decorating a confection, while its outer surface is in plastic and workable condition, which consists in establishing yieldable contact and adhesion between a flexibly supported rotating decorating tool and a side surface of the confection and bodily moving the rotating tool and causing it to follow around the perimeter of the confection a plurality of times while maintaining the contact by the adhesion to mechanically work the surface into decorative configurations.

11. The method of decorating a confection, while its outer surface is in plastic and workable condition, which consists in establishing yieldable contact and adhesion between a plastic side surface of the confection and a rotating decorating tool such that the rotary tool by its adhesion to said surface will be caused to roll around the perimeter of the confection in a path the size and shape of which is determined by the size and perimetal contour of the confection, and thereby by mechanical working form said surface into decorative configurations.

12. Apparatus for decorating freshly coated confections, comprising a confection support, a decorating tool mounted for rotation about its own axis, and located adjacent said support in the path of movement of the confections, means for rotating said tool about its axis, feeding means for effecting a relative linear movement between the support and the rotating tool to move them into contact, and means flexibly supporting said tool so that it may be deflected in directions at right angles to its axis by the abutment of the confection with the tool under the action of said feeding means.

13. Apparatus for decorating confections while their outer surfaces are in a plastic and workable condition, comprising, a rotatable tool for mechanically working the plastic surface of the confection, feeding means for successively moving the confections into and subsequently out of engagement with the tool, a flexible shaft for supporting said tool and having its axis disposed at an angle to the path of movement of the confections, and means for continuously rotating said shaft, said shaft being deflected by the engagement of each confection with the tool and the rotating tool because of its adherence to the plastic surface of the confection being forced to rotate in an orbital path and follow around the confection, whereby said surface is mechanically worked into decorative form.

14. Apparatus for decorating confections while their outer surfaces are plastic and workable, comprising, a rotatable decorating tool, a springy flexible means by which the tool is supported and rotated with freedom to move in orbital paths, and conveying means for carrying the confections one after another into engagement with the flexibly supported rotating tool to deflect the same and cause its path of rotation to be varied, whereby the tool will engage each confection at a plurality of points and work the plastic surface thereof into decorative form.

15. Apparatus for decorating confections while their outer surfaces are plastic comprising, a rotatable decorating tool, a springy flexible means by which the tool is suspended and rotated with freedom to move in orbital paths, conveying means for carrying the confections one after another into engagement with the suspended rotary tool, the tool when engaged with a confection traveling around the same while rotating about its own axis, the linear movement of the confection while engaged with the tool serving to deflect said flexible means and the springy character of such means eventually causing the tool to be disengaged from said confection and moved into engagement with a succeeding confection, and means for rotating said tool at such speed with reference to the speed of said conveying means that the tool will make at least one complete revolution around the confection while engaged therewith.

16. Apparatus for decorating confections while their outer surfaces are plastic comprising, a rotatable decorating tool, a springy flexible means by which the tool is suspended and rotated with freedom to move in orbital paths, conveying means for carrying the confections one after another into engagement with the suspended rotary tool, the tool when engaged with a confection traveling around the same while rotating about its own axis, the linear movement of the confection while engaged with the tool serving to deflect said flexible means and the springy character of such means eventually causing the tool to be disengaged from said confection and moved into engagement with a succeeding confection, and means for rotating said tool at such speed with reference to the speed of said conveying means that the tool will make a plurality of revolutions around the confection while engaged therewith.

17. Apparatus for decorating confections while their outer surfaces are plastic comprising, a rotatable decorating tool, a springy flexible means by which the tool is suspended and rotated with freedom to move in orbital paths, conveying means for carrying the confections one after another into engagement with the suspended rotary tool, the tool when engaged with a confection traveling around the same while rotating about its own axis, the linear movement of the confection while engaged with the tool serving to deflect said flexible means and the springy character of such means eventually causing the tool to be disengaged from said confection and moved into engagement with a succeeding confection, means for driving said conveying means, means for rotating said decorating tool, and means for varying the relative speed of said two last named means to vary the number of times the tool will revolve around the confection during its engagement therewith.

18. Apparatus for decorating confections while their outer surfaces are plastic and workable, comprising, conveying means for the confections, a rotatable tool for mechanically working the plastic coatings of the confections, said tool being rotatable about an axis substantially normal to the direction in which the confections are moved by said means; and a flexible shaft carrying said tool at one end and supported near the other end at a point remote from the tool, said tool being located in position to be successively engaged by the confections carried by the conveying means and deflected by each confection.

19. A confection decorating apparatus, comprising, a confection support, a shaft rotatably supported at a point above said support, a decorating tool, means by which said tool is suspended from and driven by said shaft and enabling the axis of revolution of the tool to travel in orbital paths, means for effecting relative movement between said confection support and tool to engage the latter with the confection to be decorated, and means for moving said tool in a direction toward or away from said support to vary the position in which it will be initially engaged by the confection.

20. A confection decorating apparatus, comprising, a confection support, a shaft rotatably supported at a point above said support, a decorating tool, means by which said tool is suspended from and driven by said shaft and enabling the axis of revolution of the tool to travel in orbital paths, means for effecting relative movement between said confection support and tool to engage the latter with the confection to be decorated, and means for moving said tool transversely of said support to vary the position in which the tool will be initially engaged by the confections.

21. The combination with a conveyer for carrying freshly coated confections arranged thereon in laterally-spaced longitudinally disposed rows, of a plurality of rotatable decorating tools one for each such row, a flexible shaft for each tool supported at a point above the conveyer and extending toward the same and supporting its tool in the path of movement of the confections in one such row and with freedom to move in orbital paths, said shafts being disposed in staggered relation in a transverse series, and means for alining said confections into the aforesaid rows.

22. Apparatus for decorating confections while their outer surfaces are plastic and workable, comprising, a rotatable tool for mechanically working the plastic surfaces of the confection, a flexible shaft for driving said tool and suspending it with freedom to move in orbital paths, means for rotating said shaft and tool, means for feeding confections one after another into engagement with said rotating tool to deflect the tool and shaft and cause the tool to traverse an orbital path with reference to the confection and in so doing to work the plastic surface into decorative configurations.

23. Apparatus for decorating confections while their outer surfaces are plastic and workable, comprising, a rotatable tool for mechanically working the plastic surfaces of the confection, a flexible shaft for driving said tool and suspending it with freedom to move in orbital paths, means for rotating said shaft and tool, means for feeding confections one after another into engagement with said rotating tool to deflect the tool and shaft and cause the tool to traverse an orbital path with reference to the confection and in so doing to work the plastic surface into decorative configurations, said tool being of light weight to enable its deflection by a confection and of such weight as to sink into the plastic surface without penetrating through it.

In testimony whereof I have affixed my signature.

ALONZO LINTON BAUSMAN.